(12) United States Patent
Miura et al.

(10) Patent No.: US 10,718,998 B2
(45) Date of Patent: Jul. 21, 2020

(54) ILLUMINATION DEVICE AND DISPLAY UNIT

(71) Applicant: SONY CORPORATION, Tokyo (JP)

(72) Inventors: Koji Miura, Kanagawa (JP); Takayuki Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/315,366

(22) PCT Filed: Jun. 12, 2017

(86) PCT No.: PCT/JP2017/021617
§ 371 (c)(1),
(2) Date: Jan. 4, 2019

(87) PCT Pub. No.: WO2018/016228
PCT Pub. Date: Jan. 25, 2018

(65) Prior Publication Data
US 2019/0310537 A1 Oct. 10, 2019

(30) Foreign Application Priority Data
Jul. 22, 2016 (JP) .................................. 2016-144099

(51) Int. Cl.
*G03B 21/14* (2006.01)
*G02B 27/09* (2006.01)
(Continued)

(52) U.S. Cl.
CPC ................ *G03B 21/14* (2013.01); *F21S 2/00* (2013.01); *G02B 26/0875* (2013.01);
(Continued)

(58) Field of Classification Search
CPC .... G03B 21/14; H04N 13/232; H04N 9/3161; F21S 2/00; G02B 27/0905;
(Continued)

(56) References Cited

U.S. PATENT DOCUMENTS

2013/0258294 A1* 10/2013 Kaneda .................. G02B 27/48
353/38
2015/0124227 A1 5/2015 Kobayashi
2015/0286064 A1 10/2015 Liu

FOREIGN PATENT DOCUMENTS

CN 103365053 A 10/2013
CN 104977788 A 10/2015
(Continued)

OTHER PUBLICATIONS

International Search Report and Written Opinion of PCT Application No. PCT/JP2017/021617, dated Aug. 29, 2017, 10 pages of ISRWO.

*Primary Examiner* — Jerry L Brooks
(74) *Attorney, Agent, or Firm* — Chip Law Group

(57) ABSTRACT

An illumination device includes a light source section, an optical element, and a driver. The light source section includes a laser light source. The optical element includes a periodic structure, and is disposed in an optical path of light emitted from the light source section. The driver vibrates the optical element to cause a vibration direction to be inclined to a periodic direction of the periodic structure of the optical element.

13 Claims, 15 Drawing Sheets

(51) Int. Cl.
  *G02B 27/10*     (2006.01)
  *G03B 21/00*     (2006.01)
  *G02B 27/48*     (2006.01)
  *G02B 3/00*      (2006.01)
  *H04N 13/232*    (2018.01)
  *F21S 2/00*      (2016.01)
  *G02F 1/13*      (2006.01)
  *H04N 9/31*      (2006.01)
  *G02B 26/08*     (2006.01)
  *G02B 5/02*      (2006.01)

(52) U.S. Cl.
  CPC ..... *G02B 27/0905* (2013.01); *G02B 27/0933* (2013.01); *G02B 27/0955* (2013.01); *G02B 27/10* (2013.01); *G02B 27/48* (2013.01); *G02F 1/13* (2013.01); *G03B 21/00* (2013.01); *H04N 9/3161* (2013.01); *H04N 13/232* (2018.05); *G02B 3/0056* (2013.01); *G02B 3/0062* (2013.01); *G02B 5/0215* (2013.01)

(58) Field of Classification Search
  CPC ............ G02B 27/0933; G02B 27/0955; G02B 27/10; G02B 3/0056; G02B 3/0062; G02B 5/0215; G02F 1/13
  USPC .......................................................... 353/30
  See application file for complete search history.

(56) References Cited

FOREIGN PATENT DOCUMENTS

| | | |
|---|---|---|
| JP | 2011-145556 A | 7/2011 |
| JP | 2013-083988 A | 5/2013 |
| JP | 2013-231940 A | 11/2013 |
| TW | 201539043 A | 10/2015 |
| WO | 2014/020839 A1 | 2/2014 |

* cited by examiner

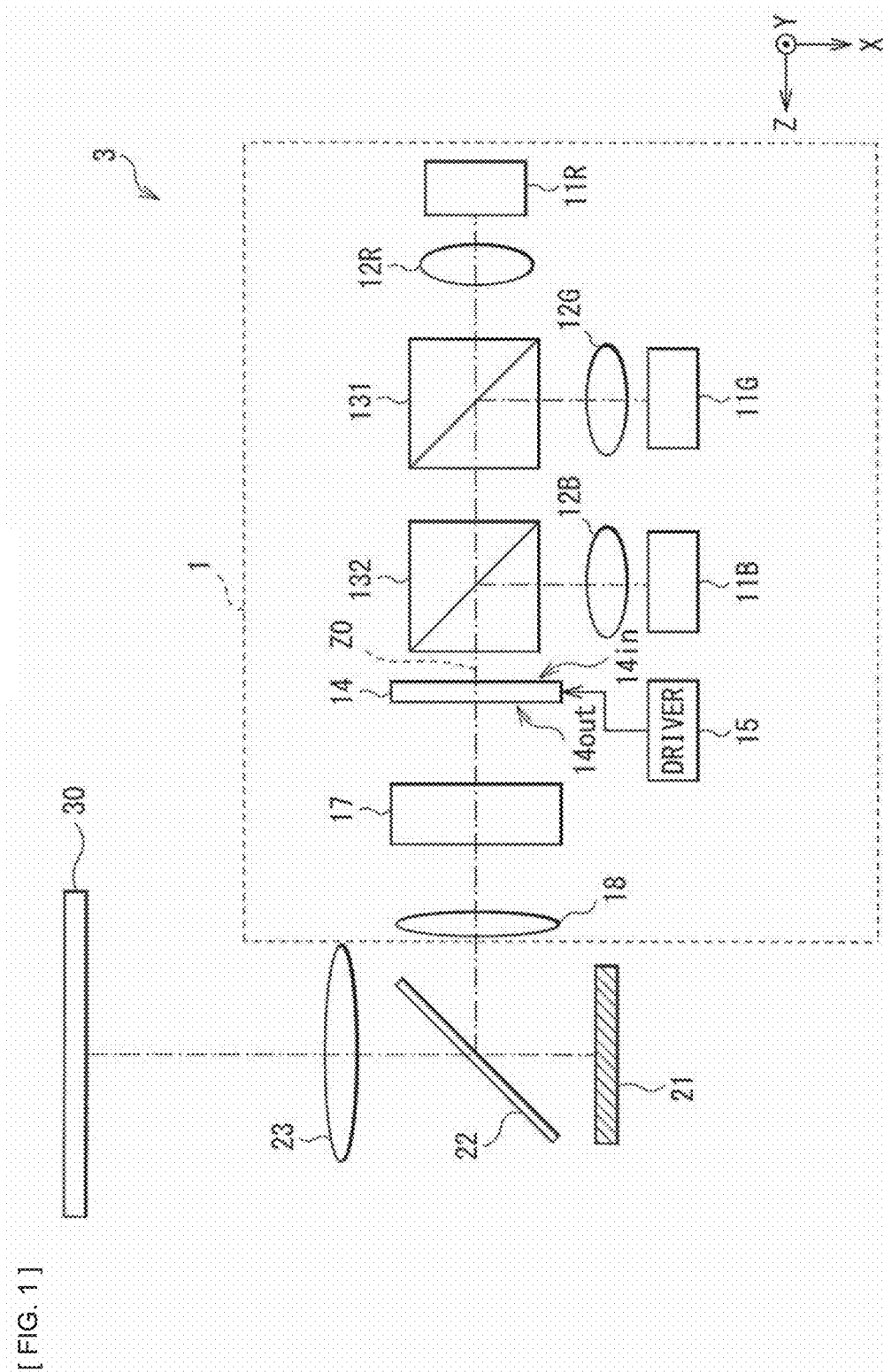
[FIG. 1]

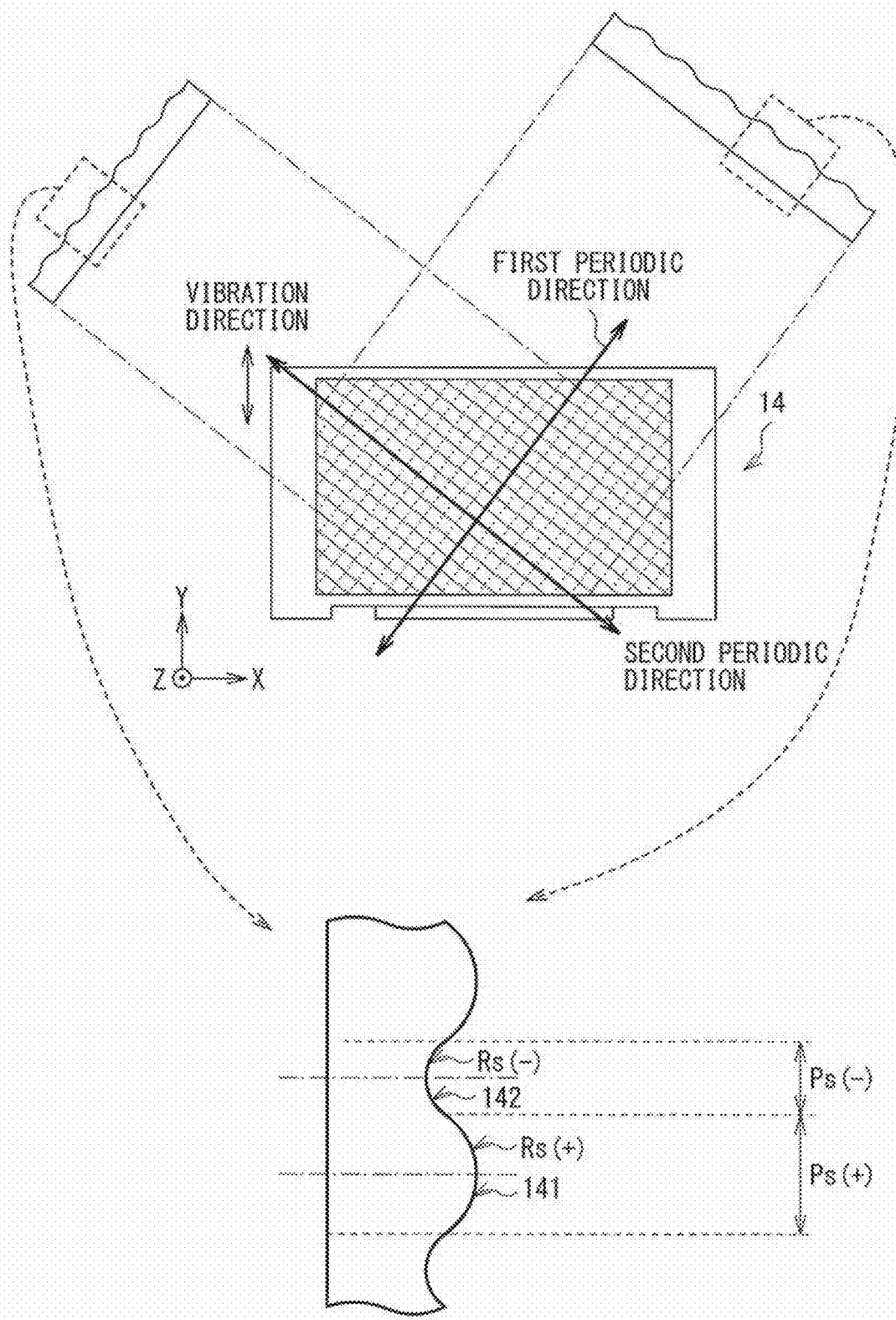
[FIG. 2]

[FIG. 3]
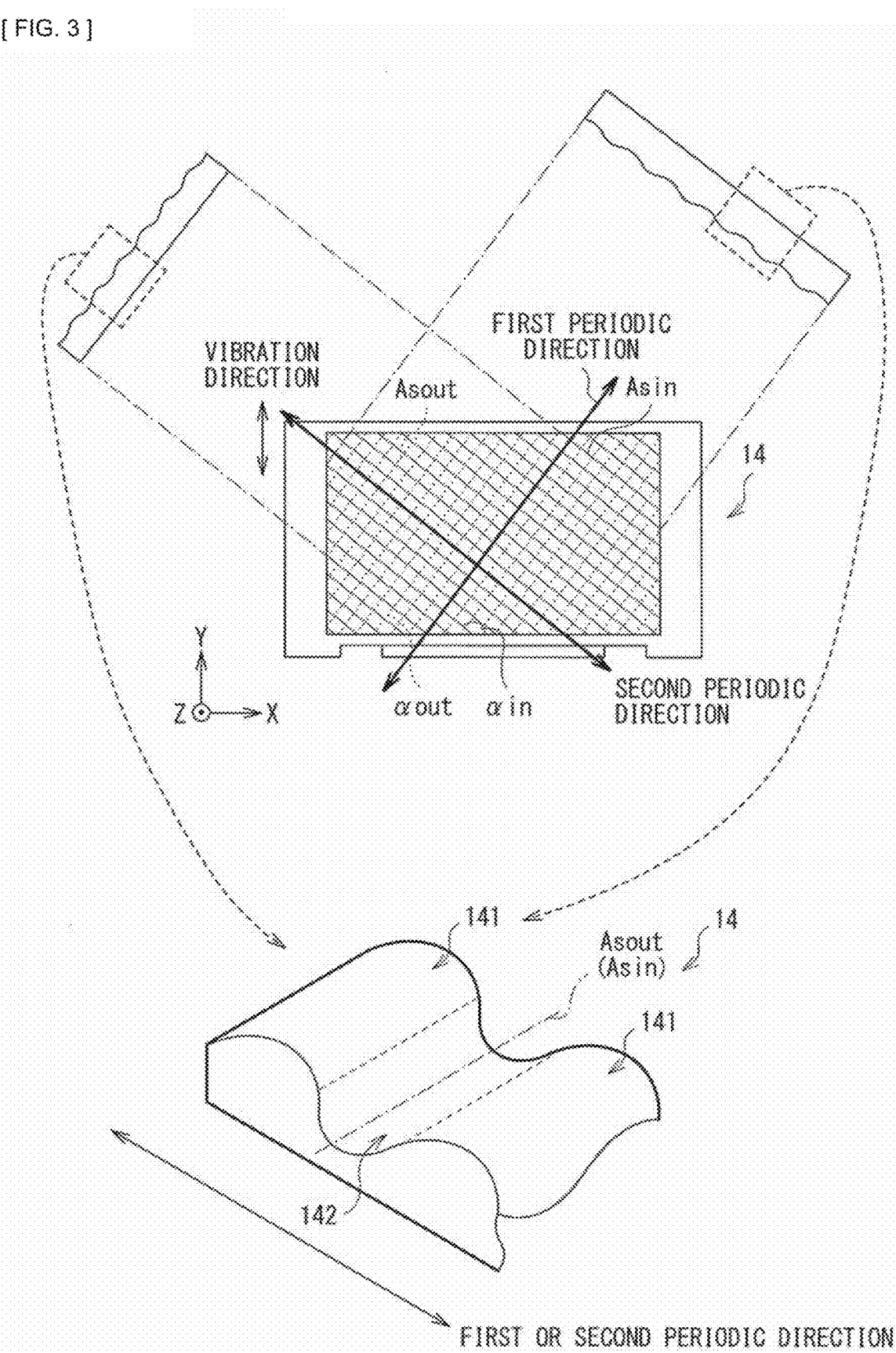

[FIG. 4]
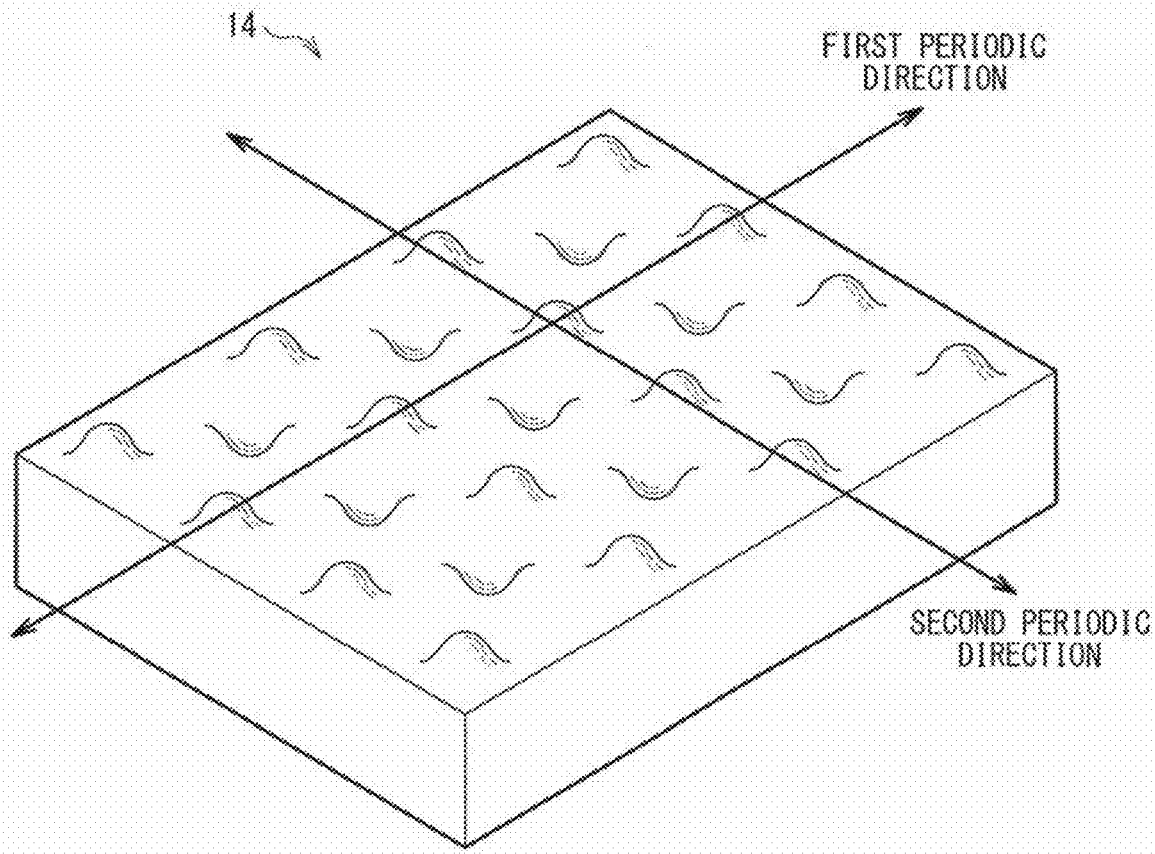
[FIG. 5]
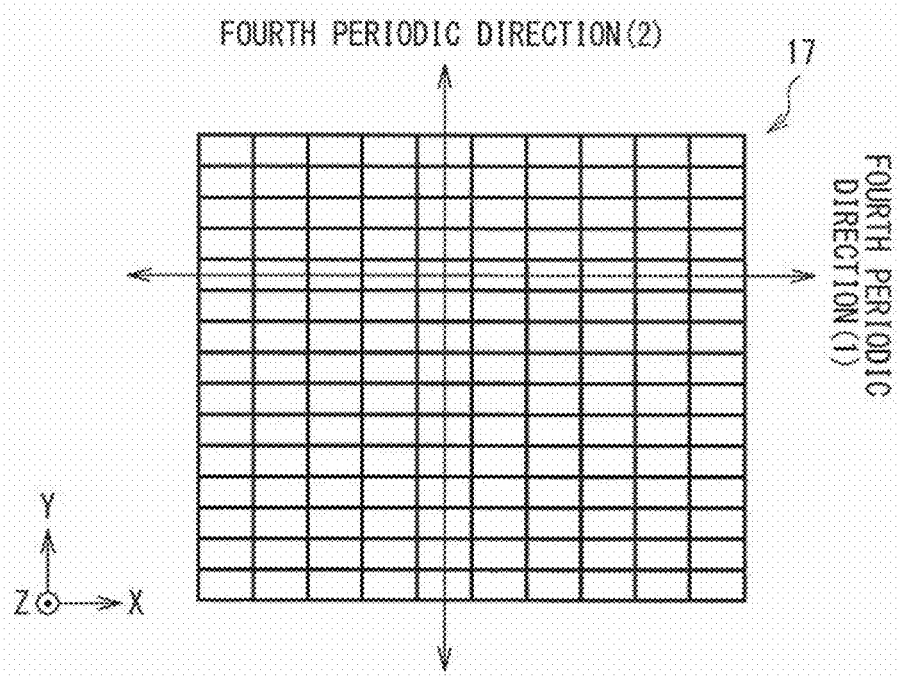

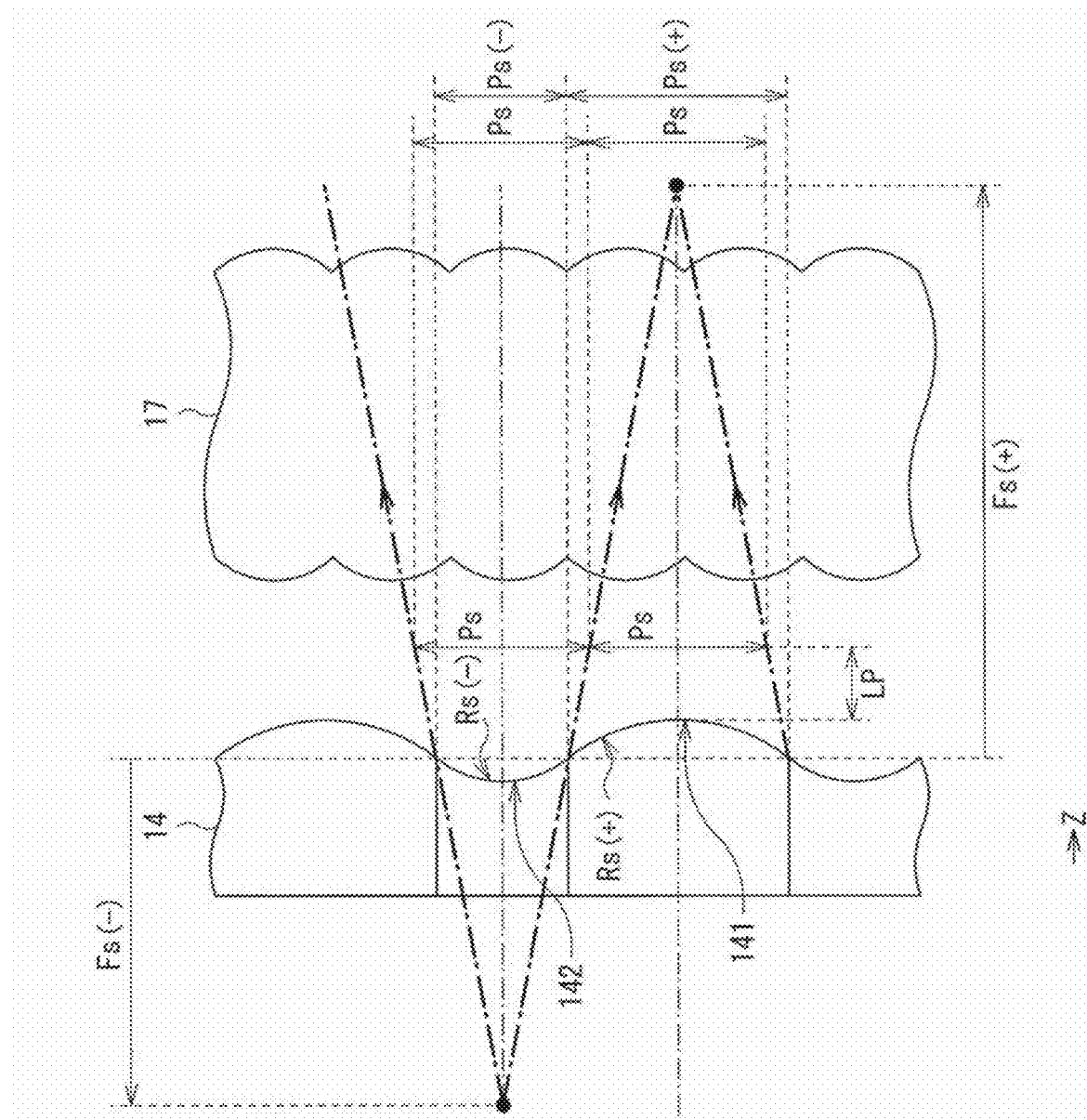
[FIG. 6]

[FIG. 7]
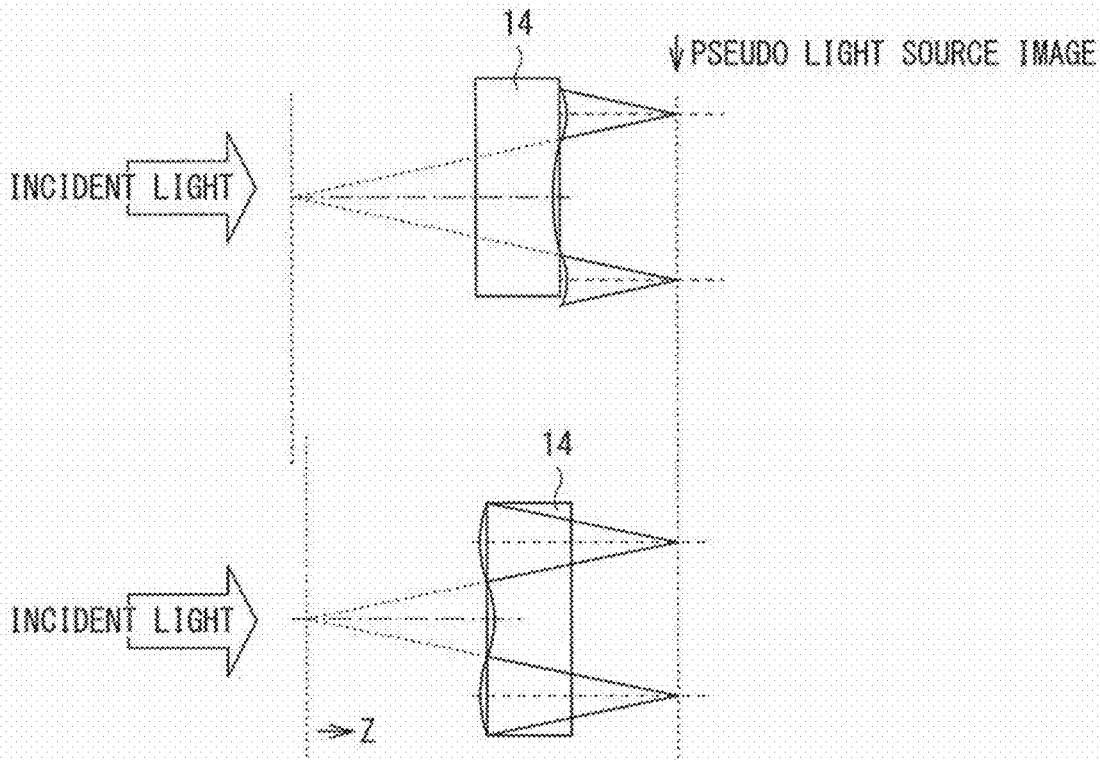
[FIG. 8]
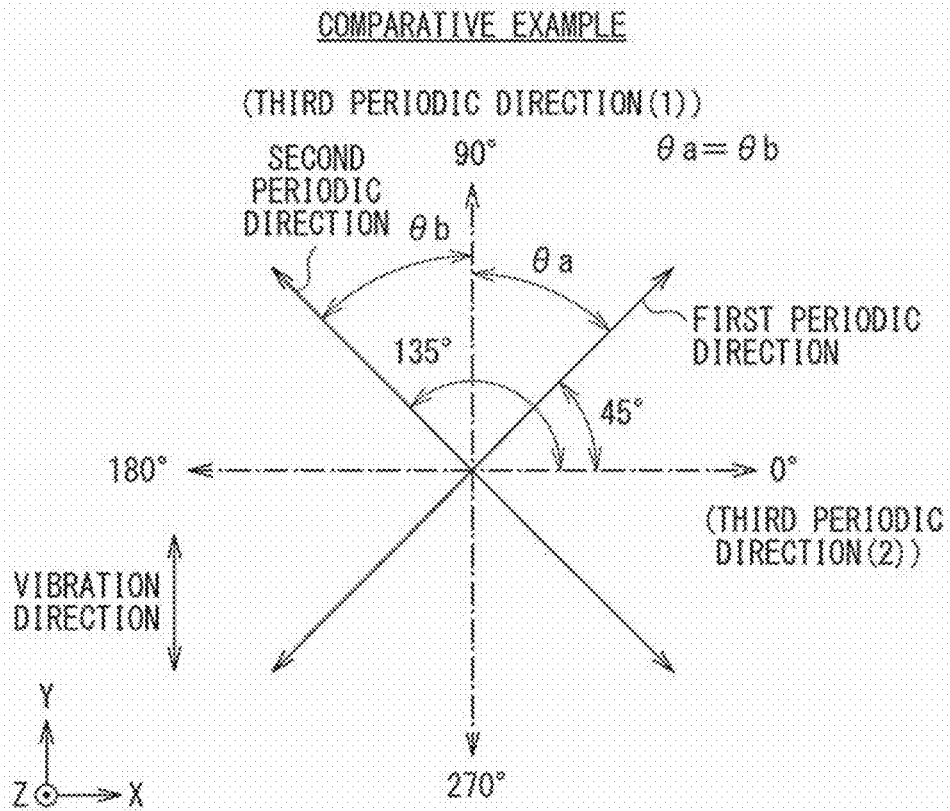

[FIG. 9]
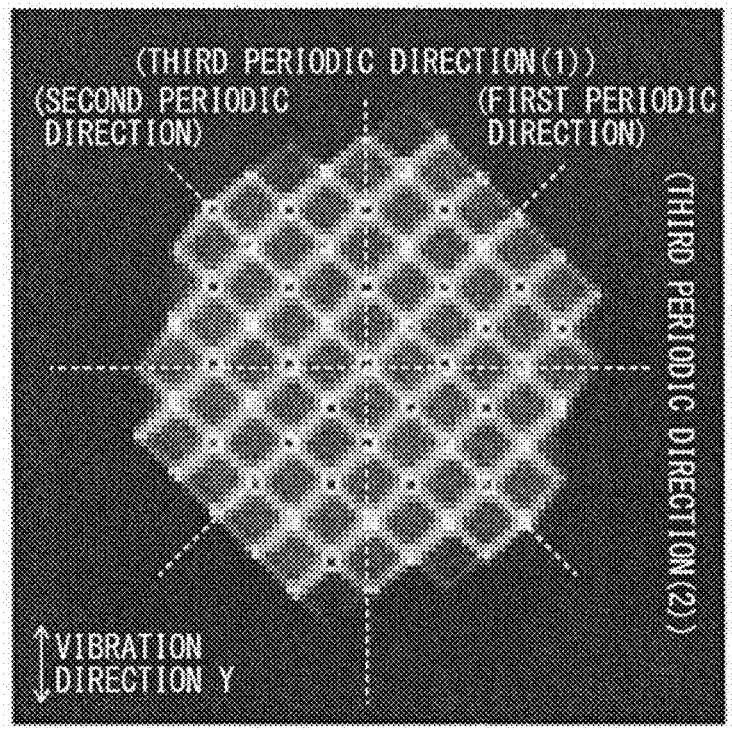

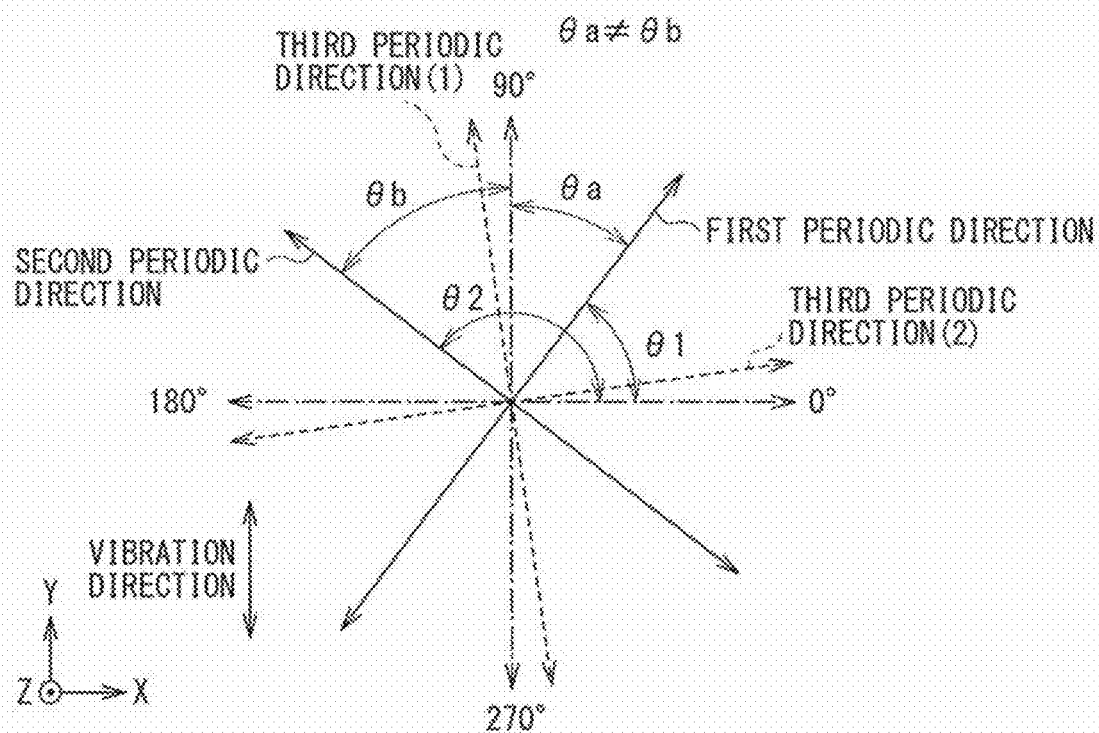
[FIG. 10]

[FIG. 11]
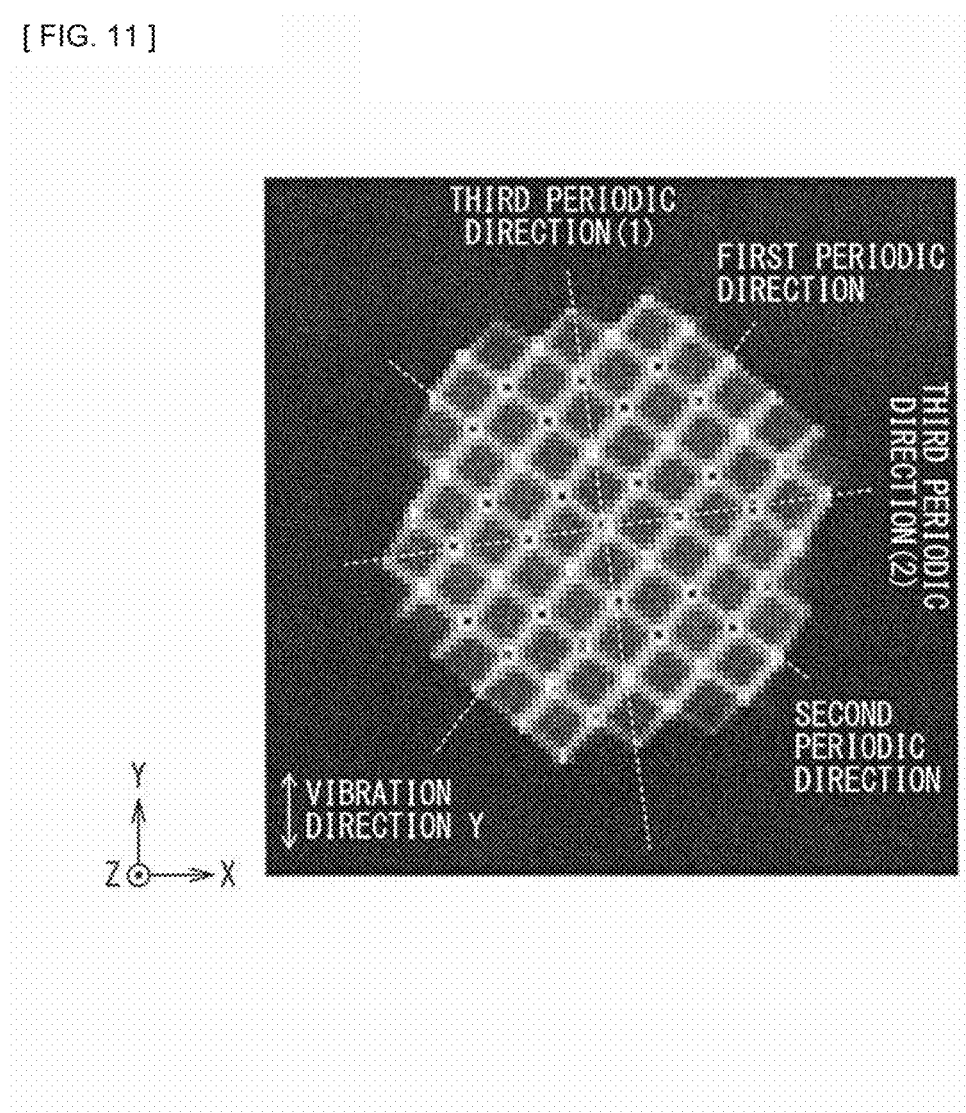

[FIG. 12]
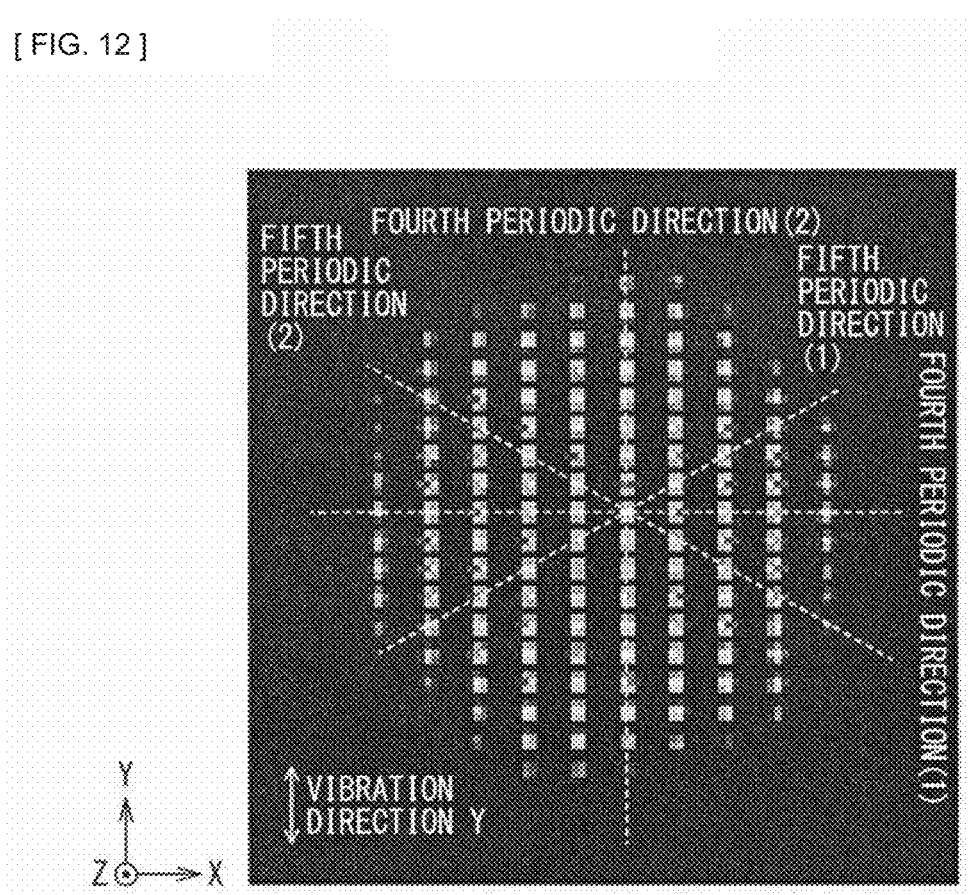

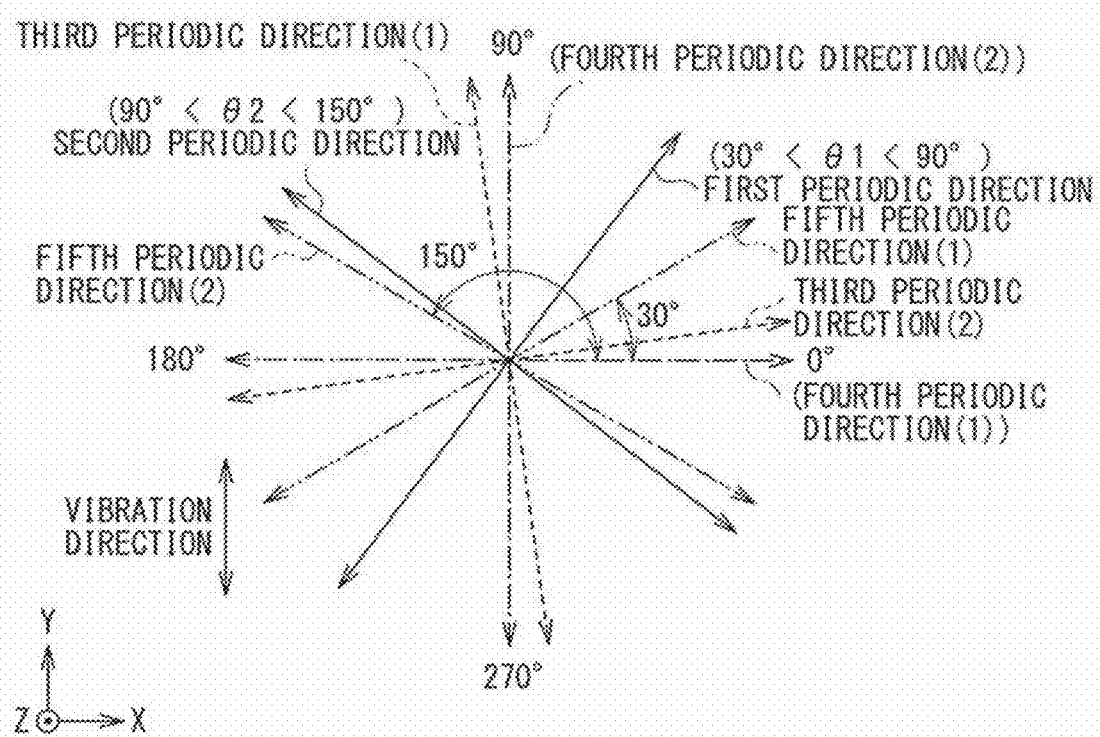
[FIG. 13]

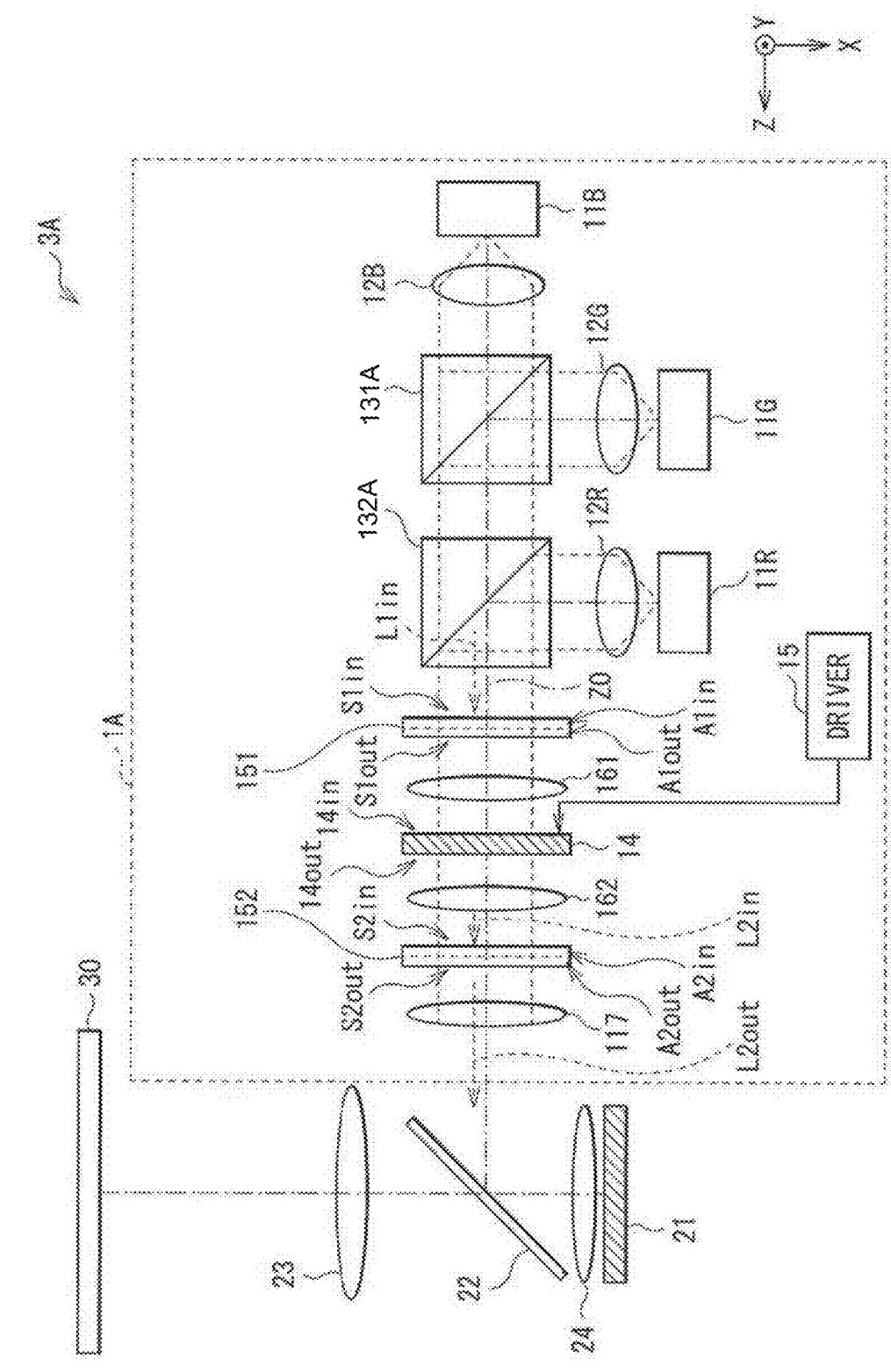
[ FIG. 14 ]

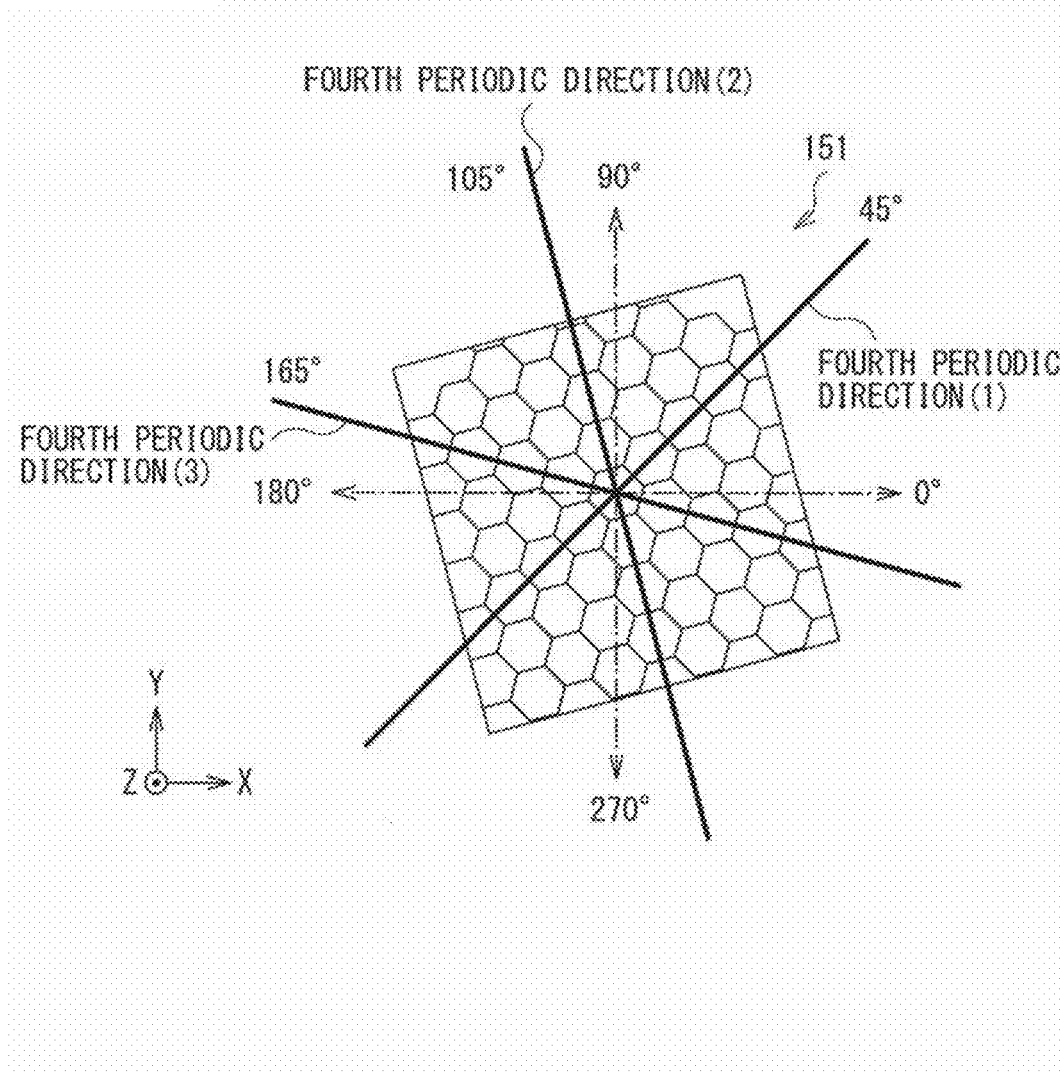

[FIG. 16]
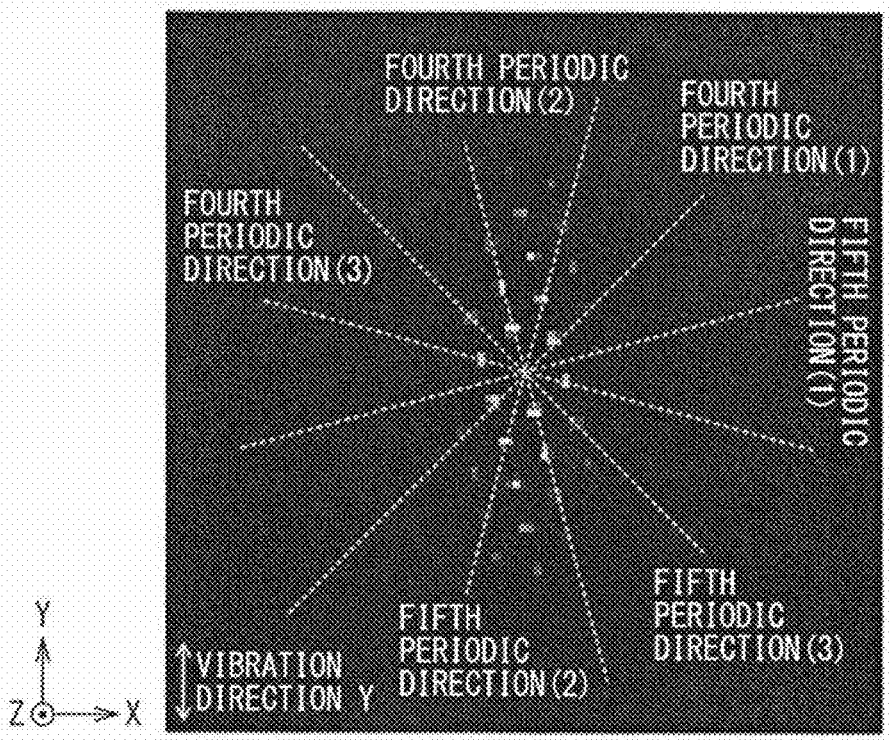

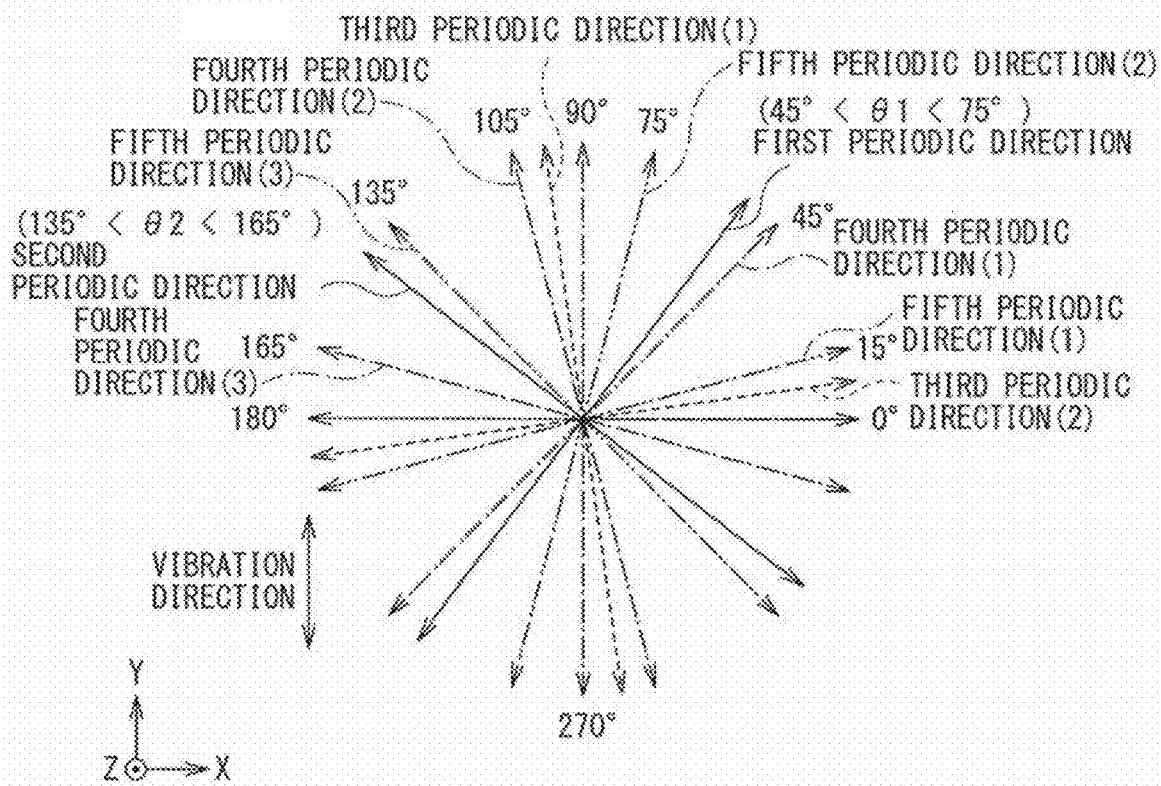
[FIG. 17]

ILLUMINATION DEVICE AND DISPLAY UNIT

CROSS REFERENCE TO RELATED APPLICATIONS

This application is a U.S. National Phase of International Patent Application No. PCT/JP2017/021617 filed on Jun. 12, 2017, which claims priority benefit of Japanese Patent Application No. JP 2016-144099 filed in the Japan Patent Office on Jul. 22, 2016. Each of the above-referenced applications is hereby incorporated herein by reference in its entirety.

TECHNICAL FIELD

The present disclosure relates to an illumination device including a laser light source, and to a display unit that performs image display with use of such an illumination device.

BACKGROUND ART

In recent years, a projector that projects an image on a screen has been widely used not only at an office but also at home. The projector modulates light from a light source by a light valve (light modulation element) to generate image light, and projects the image light on the screen to perform display. In recent years, a palm-sized small projector using a solid-state light emitting element such as an LED (Light Emitting Diode) or an LD (Laser Diode) as a light source, a mobile phone including the small projector, and the like have started to be widely used.

CITATION LIST

Patent Literature

PTL 1: Japanese Unexamined Patent Application Publication No. 2013-83988
PTL 2: Japanese Unexamined Patent Application Publication No. 2013-231940

SUMMARY OF INVENTION

The projector is typically requested to reduce luminance unevenness (illuminance unevenness) in illumination light emitted from an illumination device, to improve display image quality.

It is desirable to provide an illumination device and a display unit that make it possible to reduce luminance unevenness in illumination light.

An illumination device according to an embodiment of the present disclosure includes a light source section, an optical element, and a driver. The light source section includes a laser light source. The optical element includes a periodic structure, and is disposed in an optical path of light emitted from the light source section. The driver vibrates the optical element to cause a vibration direction to be inclined to a periodic direction of the periodic structure of the optical element.

A display unit according to an embodiment of the present disclosure includes an illumination device and a light modulation element. The light modulation element modulates illumination light from the illumination device on a basis of an image signal. The illumination device includes a light source section, an optical element, and a driver. The light source section includes a laser light source. The optical element includes a periodic structure, and is disposed in an optical path of light emitted from the light source section. The driver vibrates the optical element to cause a vibration direction to be inclined to a periodic direction of the periodic structure of the optical element.

In the illumination device or the display unit according to the respective embodiments of the present disclosure, the optical element is vibrated to allow the vibration direction to be inclined to the periodic directions of the periodic structure of the optical element.

According to the illumination device or the display unit of the respective embodiments of the present disclosure, the vibration direction of the optical element is inclined to the periodic directions of the periodic structure of the optical element. This makes it possible to reduce luminance unevenness in the illumination light.

Note that the effects described here are not necessarily limited, and any of effects described in the present disclosure may be included.

BRIEF DESCRIPTION OF DRAWINGS

FIG. 1 is a configuration diagram illustrating a configuration example of a display unit according to a first embodiment of the present disclosure.

FIG. 2 is a configuration diagram schematically illustrating a configuration example of an optical element of an illumination device according to the first embodiment.

FIG. 3 is a partially enlarged view of a first example of a surface shape of the optical element.

FIG. 4 is a configuration diagram illustrating a second example of the surface shape of the optical element.

FIG. 5 is a configuration diagram illustrating an example of a periodic structure of a fly-eye lens.

FIG. 6 is a configuration diagram illustrating a configuration example of the optical element and the fly-eye lens.

FIG. 7 is an explanatory diagram illustrating an example of a pseudo light source image by the optical element.

FIG. 8 is an explanatory diagram illustrating an example of first to third periodic directions of an optical element according to a comparative example.

FIG. 9 is an explanatory diagram illustrating an example of a pseudo light source image by the optical element according to the comparative example.

FIG. 10 is an explanatory diagram illustrating an example of first to third periodic directions relating to the optical element in the illumination device according to the first embodiment.

FIG. 11 is an explanatory diagram illustrating an example of the pseudo light source image by the optical element in the illumination device according to the first embodiment.

FIG. 12 is an explanatory diagram illustrating an example of a pseudo light source image by the fly-eye lens in the illumination device according to the first embodiment.

FIG. 13 is an explanatory diagram illustrating an example of first to fifth periodic directions relating to the optical element and the fly-eye lens in the illumination device according to the first embodiment.

FIG. 14 is a configuration diagram schematically illustrating a configuration example of a display unit according to a second embodiment.

FIG. 15 is a configuration diagram illustrating an example of a periodic structure of a fly-eye lens in an illumination device according to the second embodiment.

FIG. 16 is an explanatory diagram illustrating an example of a pseudo light source image by the fly-eye lens in the illumination device according to the second embodiment.

FIG. 17 is an explanatory diagram illustrating an example of first to fifth periodic directions relating to the optical element and the fly-eye lens in the illumination device according to the second embodiment.

MODES FOR CARRYING OUT THE INVENTION

Some embodiments of the present disclosure are described in detail below with reference to drawings. Note that description is given in the following order.

0. Comparative example (FIG. 8 and FIG. 9)
1. First embodiment (FIG. 1 to FIG. 7, and FIG. 10 to FIG. 13)
1.1 Overall description of display unit
1.2 Detailed description of optical element and uniformizing optical member (description of periodic directions)
1.3 Effects
2. Second embodiment (FIG. 14 to FIG. 17)
2.1 Overall description of display unit
2.2 Detailed description of optical element and uniformizing optical member (description of periodic directions)
2.3 Effects
3. Other embodiments

0. Comparative Example

One of determiners to determine image quality of a projector is uniformity of illuminance such as brightness and color within a screen. The projector typically uses an integrator including a fly-eye lens, etc. to reduce luminance unevenness of illumination light (to uniformize luminance of illumination light). Even when the integrator is used, however, the luminance unevenness of the illumination light may not be sufficiently reduced (luminance distribution may not become uniform) due to speckle noise, interference fringe that is caused by a periodic structure of a fly-eye lens, etc., in particular, in a case where a laser is used as the light source. Accordingly, further improvement is demanded.

In PTL 1 (Japanese Unexamined Patent Application Publication No. 2013-83988), in order to reduce the speckle noise, an optical element including a periodic structure that changes one or both of a light incident position and a light incident angle of light entering the fly-eye lens, is temporally displaced. In PTL 2 (Japanese Unexamined Patent Application Publication No. 2013-231940), in order to further reduce the interference fringe caused by the periodic structure, a configuration is adopted in which the periodic structure of the optical element is extended in a plurality of directions.

A periodic direction of the periodic structure of the optical element disclosed in the above-described patent literatures is, for example, 45° (or 135°) with respect to a horizontal direction as illustrated in FIG. 8 and FIG. 9 described later. Further, a period of a pseudo light source image formed when light enters the optical element including the periodic structure is arranged, for example, in 0° (or 90°) direction with respect to the horizontal direction, and is coincident with a period (0° or 90°) of the fly-eye lens. The speckle is reduced when the optical element is driven; however, in a case where a vibration direction of the optical element is 90°, an averaging effect is weak with respect to the interference fringe generated in the 90° direction, which may cause luminance unevenness of the illumination light.

1. First Embodiment

[1.1 Overall Description of Display Unit]
[Overall Configuration of Display Unit]

FIG. 1 illustrates a configuration example of a display unit 3 according to a first embodiment of the present disclosure.

The display unit 3 is a projector that projects image (image light) on a screen 30 (projection surface), and includes an illumination device 1 and an optical system (display optical system) that performs image display with use of illumination light from the illumination device 1.

Note that, in FIG. 1, an axis parallel to an optical axis Z0 is defined as a Z axis. Further, an axis parallel to a horizontal axis (lateral axis) in a cross-section orthogonal to the Z axis is defined as an X axis, and an axis parallel to a perpendicular axis (vertical axis) in the cross-section orthogonal to the Z axis is defined as a Y axis. Similar definition may be applied to the following other drawings.

(Illumination Device 1)

The illumination device 1 includes a red laser 11R, a green laser 11G, a blue laser 11B, coupling lenses 12R, 12G, and 12B, dichroic prisms 131 and 132, an optical element 14, a driver 15, a fly-eye lens 17, and a condenser lens 18.

The red laser 11R, the green laser 11G, and the blue laser 11B are three types of light sources respectively emitting red laser light, green laser light, and blue laser light. A light source section is configured by these laser light sources. Each of the three types of light sources is a laser light source. Each of the red laser 11R, the green laser 11G, and the blue laser 11B includes, for example, a semiconductor laser, a solid-state laser, etc. A wavelength $\lambda r$ of the red laser light by the red laser 11R is within a range of about 600 nm to about 700 nm, specifically, may be about 640 nm. A wavelength $\lambda g$ of the green laser light is within a range of, for example, about 500 nm to about 600 nm, specifically, may be about 520 nm. A wavelength $\lambda b$ of the blue laser light is within a range of, for example, about 400 nm to about 500 nm, specifically, may be about 450 nm.

The coupling lenses 12R and 12G are lenses to respectively collimate the red laser light emitted from the red laser 11R and the green laser light emitted from the green laser 11G (into parallel light), to couple the collimated light to the dichroic prism 131. Likewise, the coupling lens 12B collimates the laser light emitted from the blue laser 11B (into parallel light), to couple the collimated light to the dichroic prism 132. Note that, in this example, incident laser light is collimated (into parallel light) by the coupling lenses 12R, 12G, and 12B; however, the configuration is not limited to the case. The laser light may not be collimated by the coupling lenses 12R, 12G, and 12B (into parallel light). It is more desirable, however, that collimating be performed as described above because it is possible to downsize the unit configuration.

The dichroic prism 131 is a prism that allows the red laser light incident through the coupling lens 12R to be selectively transmitted therethrough, whereas selectively reflects the green laser light incident through the coupling lens 12G. The dichroic prism 132 is a prism that allows the red laser light and the green laser light outputted from the dichroic prism 131 to be selectively transmitted therethrough, whereas selectively reflects the blue laser light incident through the coupling lens 12B. As a result, color synthesis (optical path synthesis) of the red laser light, the green laser light, and the blue laser light is performed.

Note that a dichroic mirror may be used in place of each of the dichroic prisms 131 and 132.

The optical element 14 is disposed in an optical path of the light emitted from the light source section. The optical element 14 is disposed in an optical path between the light source section and the fly-eye lens 17, specifically, in an optical path between the dichroic prism 132 and the fly-eye lens 17. The optical element 14 is an element to reduce speckle noise (interference pattern), and laser light traveling in the optical axis Z0 illustrated in the diagram passes through the optical element 14. The optical element 14 includes a light incident surface 14in, and a light output surface 14out.

The driver 15 displaces a relative position between the optical element 14 and the fly-eye lens 17, to change one or both of a light incident position and a light incident angle of the laser light (light incident position or light incident angle or both of light incident position and light incident angle) in an incident surface of the fly-eye lens 17. The driver 15 vibrates (finely vibrates) the optical element 14. A vibration direction of the optical element 14 by the driver 15 is, for example, the Y-axis direction. The driver 15 includes, for example, a coil and a permanent magnet (e.g., permanent magnet including material such as neodymium (Nd), iron (Fe), and boron (B)). Note that examples of the displacement of the above-described relative position and the displacement of one or both of the incident position and the incident angle include a periodic displacement (change); however, the displacement is not limited thereto, and other displacement (change) method may be used. Further, examples of a driving method by the driver 15 include a method of reciprocally displacing the above-described relative position at a driving frequency equal to or higher than a predetermined frequency (e.g., 15 Hz).

The fly-eye lens 17 is a uniformizing optical member that is disposed in the optical path of the light emitted from the light source section, and uniformizes light illuminance distribution in a predetermined illumination range illuminated by the light from the light source section.

For example, the fly-eye lens 17 is an integrator in which a plurality of unit lenses are two-dimensionally arranged on a substrate, and spatially divides an incident light flux in accordance with the arrangement of the plurality of unit lenses, and outputs the divided light fluxes. As a result, the light outputted from the fly-eye lens 17 is uniformized (intensity distribution in plane is uniformized), and the uniformized light is outputted as illumination light.

The condenser lens 18 is a lens to condense incident light (illumination light) that has been uniformized by the fly-eye lens 17.

(Display Optical System)

The above-described display optical system is configured by a polarization beam splitter (PBS) 22, a reflective liquid crystal element 21, and a projection lens 23 (projection optical system).

The polarization beam splitter 22 is an optical member that selectively reflects specific polarized light (e.g., s-polarized light), and allows the other polarized light (e.g., p-polarized light) to be selectively transmitted therethrough as well. As a result, the illumination light (e.g., s-polarized light) from the illumination device 1 is selectively reflected by the polarization beam splitter 22 so as to enter the reflective liquid crystal modulation element 21, and image light (e.g., p-polarized light) outputted from the reflective liquid crystal modulation element 21 is selectively transmitted through the polarization beam splitter 22 so as to enter the projection lens 23.

For example, the polarization beam splitter 22 may have a configuration in which prisms coated with a multilayer film are joined to each other. Further, the polarization beam splitter 22 may be an element having polarization characteristics (e.g., wire grid or polarization film), or a beam splitter similar to a prism interposing the element.

The reflective liquid crystal element 21 is a light modulation element that outputs the image light by reflecting the illumination light from the illumination device 1 while modulating the illumination light on the basis of an image signal supplied from an unillustrated display controller. At this time, the reflective liquid crystal element 21 performs reflection to allow polarized light in entering and polarized light in outputting (for example, s-polarized light or p-polarized light) to be different from each other. Such a reflective liquid crystal element 21 includes a liquid crystal element such as LCOS (Liquid Crystal On Silicon).

The projection lens 23 is a projection optical system that projects (enlarges and projects) the illumination light (image light) modulated by the reflective liquid crystal element 21, on the projection surface (screen 30).

(Display Operation)

In the illumination device 1 of the display unit 3, the light (laser light) emitted from the red laser 11R, the green laser 11G, and the blue laser 11B are first respectively collimated by the coupling lenses 12R, 12G, and 12B into parallel light. Next, the laser light (red laser light, green laser light, and blue laser light) thus collimated into the parallel light is subjected to color synthesis (optical path synthesis) by the dichroic prisms 131 and 132. The laser light subjected to the optical path synthesis passes through the optical element 14, and then enter the fly-eye lens 17. The incident light is uniformized (uniformized in intensity distribution in plane) by the fly-eye lens 17, and the resultant light is outputted and is then condensed by the condenser lens 18. The illumination light is emitted from the illumination device 1 in such a manner.

Next, the illumination light is selectively reflected by the polarization beam splitter 22, and the reflected illumination light enters the reflective liquid crystal element 21. In the reflective liquid crystal element 21, the incident light is reflected while being modulated on the basis of the image signal, and the resultant light is outputted as the image light. At this time, the polarized light varies between in entering and in outputting in the reflective liquid crystal element 21, and thus the image light outputted from the reflective liquid crystal element 21 is selectively transmitted through the polarization beam splitter 22 and enters the projection lens 23. Thereafter, the incident light (image light) is projected (enlarged and projected) onto the screen 30 by the projection lens 23.

At this time, the red laser 11R, the green laser 11G, and the blue laser 11B each sequentially generate light (perform pulse light emission) time-divisionally, and emit laser light (red laser light, green laser light, and blue laser light). In addition, in the reflective liquid crystal element 21, the laser light of a corresponding color is sequentially modulated time-divisionally on the basis of the image signal of each of color components (red component, green component, and blue component). As a result, color image display based on the image signal is performed in the display unit 3.

[1. 2 Detailed Description of Optical Element and Uniformizing Optical Member (Description of Periodic Directions)]

(Configuration of Optical Element 14)

FIG. 2 schematically illustrates a configuration example of the optical element 14. FIG. 3 illustrates a first example of a surface shape of the optical element 14. FIG. 4 illustrates a second example of the surface shape of the optical element 14. FIG. 5 illustrates an example of a periodic structure of the fly-eye lens 17. FIG. 6 illustrates a configuration example of the optical element 14 and the fly-eye lens 17.

The optical element 14 includes a periodic structure, for example, a periodic concavo-convex surface on each of the light incident surface 14in and the light output surface 14out, or on any one of the light incident surface 14in and the light output surface 14out. The optical element 14 includes the periodic structure in a first periodic direction and a second periodic direction that are different from each other. Note that FIG. 2 illustrates an example in which the periodic structure is provided on any one of the light incident surface 14in and the light output surface 14out, and FIG. 3 illustrates an example in which the periodic structure is provided on each of the light incident surface 14in and the light output surface 14out.

FIG. 3 illustrates an example of the surface shape in a case where the periodic structure is provided on each of the light incident surface 14in and the light output surface 14out of the optical element 14. As illustrated in FIG. 3, the periodic structure may be provided in the first periodic direction on the light incident surface 14in, and the periodic structure may be provided in the second periodic direction on the light output surface 14out as well.

FIG. 4 illustrates an example of the surface shape in a case where the periodic structure is provided on any one of the light incident surface 14in and the light output surface 14out of the optical element 14. As illustrated in FIG. 4, the optical element 14 may include the periodic structure in the first periodic direction and the second periodic direction on any one of the light incident surface 14in and the light output surface 14out.

The optical element 14 includes a first optical surface 141 that outputs the incident laser light while converging the incident laser light, and a second optical surface 142 that outputs the incident laser light while diffusing the incident laser light. The optical element 14 includes the first optical surface 141 and the second optical surface 142 on one or both of the light incident surface 14in and the light output surface 14out.

As illustrated in FIG. 6, in the optical element 14, the first optical surface 141 and the second optical surface 142 are coupled to each other to allow an optical path of the converged light outputted from the first optical surface 141 and an optical path of the diffused light outputted from the second optical surface 142 to be continuously changed.

In the optical element 14, a pitch of the first optical surface 141 and a pitch of the second optical surface 142 may be different from each other.

Here, description is given of the structure of the optical element 14 in a case where the optical element 14 includes the surface shape in FIG. 3, as an example. In the case of the surface shape in FIG. 3, the optical element 14 includes a structure in which the first optical surface 141 including a convex curved surface and the second optical surface 142 including a concave curved surface are alternately arranged (one-dimensionally arranged). Here, in FIG. 2 and FIG. 6, the pitch of the first optical surface 141 is denoted by Ps(+), a radius of curvature of the first optical surface 141 is denoted by Rs(+), the pitch of the second optical surface 142 is denoted by Ps(−), and a radius of curvature of the second optical surface 142 is denoted by Rs(−). In this example, the pitch Ps(+) of the first optical surface 141 and the pitch Ps(−) of the second optical surface 142 are different from each other (here, Ps(+)>Ps(−) holds true).

In the case of the surface shape in FIG. 3, the first optical surface 141 and the second optical surface 142 both extend along the same direction, in the optical element 14.

For example, as schematically illustrated in FIG. 6, the first optical surface 141 includes a function of outputting the incident laser light while converging the incident laser light, whereas the second optical surface 142 includes a function of outputting the incident laser light while diffusing the incident laser light. Further, in the optical element 14, the first optical surface 141 and the second optical surface 142 are smoothly coupled to each other to allow the optical path of the converged light outputted from the first optical surface 141 and the optical path of the diffused light outputted from the second optical surface 142 to be continuously (sparsely and densely) changed. Note that Fs(+) illustrated in FIG. 6 indicates a focal length on the first optical surface 141, and Fs(−) indicates a focal length on the second optical surface 142. Further, LP indicates a distance between the optical element 14 and a plane on which a light flux width of the converged light outputted from the first optical surface 141 and a light flux width of the diffused light outputted from the second optical surface 142 are equal to each other (both become pitch Ps).

In the case of the surface shape in FIG. 3, as described above, the periodic structure is provided on each of the light incident surface 14in and the light output surface 14out of the optical element 14. In this case, an optical surface extension axis Asin on side of the light incident surface 14in of the optical element 14 and an optical surface extension axis Asout on side of the light output surface 14out are different from each other. Further, in accordance therewith, an inclination angle αin of the optical surface extension axis Asin and an inclination angle αout of the optical surface extension axis Asout are different from each other, namely, two types of inclination angles are provided.

(Relationship Between Periodic Directions and Vibration Direction of Optical Element 14)

FIG. 7 illustrates an example of a pseudo light source image by the optical element 14. FIG. 8 illustrates an example of first to third periodic directions of an optical element according to a comparative example. FIG. 9 illustrates an example of a pseudo light source image by the optical element according to the comparative example. FIG. 10 illustrates an example of first to third periodic directions relating to the optical element 14. FIG. 11 illustrates an example of the pseudo light source image by the optical element 14.

As illustrated in FIG. 10 and FIG. 11, the optical element 14 is disposed to allow the first and second periodic directions and the vibration direction of the optical element 14 to be inclined from each other. The driver 15 vibrates the optical element 14 to allow the vibration direction to be inclined to the first and second periodic directions.

As illustrated in FIG. 10, an angle θa formed by the first periodic direction and the vibration direction and an angle θb formed by the second periodic direction and the vibration direction are asymmetrical (θa≠θb) about the vibration direction.

As illustrated in FIG. 7, the optical element 14 forms a pseudo light source image at a position slightly separated from the outputting surface. More specifically, as illustrated in FIG. 10 and FIG. 11, the optical element 14 forms a periodic pseudo light source image (first pseudo light source image) in the first and second periodic directions and in the third periodic direction that is different from the first and second periodic directions. Here, the third periodic direction includes a plurality of third periodic directions (1) and (2) different from each other. The driver 15 vibrates the optical element 14 to allow the vibration direction to be inclined to any of the first to third periodic directions.

Here, a comparative example illustrated in FIG. 8 and FIG. 9 illustrates an example in which the first and second periodic directions of the periodic structure of the optical element 14 are respectively set to 45° and 135° with respect to the horizontal direction. In the comparative example, the angle θa formed by the first periodic direction and the vibration direction and the angle θb formed by the second periodic direction and the vibration direction are symmetrical (θa=θb) about the vibration direction.

In the comparative example, the third periodic directions (1) and (2) of the pseudo light source image are respectively 90° and 0° with respect to the horizontal direction. The vibration direction of the optical element 14 by the driver 15 is coincident with the third periodic direction (1). Accordingly, an averaging effect becomes weak to the interference fringe that occurs in the 90° direction, which may cause luminance unevenness of the illumination light.

In contrast, in the present embodiment, as illustrated in FIG. 10 and FIG. 11, the driver 15 vibrates the optical element 14 to allow the vibration direction to be inclined to any of the first to third periodic directions. Therefore, the luminance unevenness of the illumination light may be reduced as compared with the comparative example.

(Relationship Between Periodic Directions and Vibration Direction of Fly-Eye Lens 17)

FIG. 12 illustrates an example of a pseudo light source image by the fly-eye lens 17. FIG. 13 illustrates an example of first to fifth periodic directions relating to the optical element 14 and the fly-eye lens 17.

As illustrated in FIG. 5, the fly-eye lens 17 serving as the uniformizing optical member includes the periodic structure in a fourth periodic direction. As illustrated in FIG. 12 and FIG. 13, the fly-eye lens 17 forms a periodic pseudo light source image (second pseudo light source image) in the fourth periodic direction and in a fifth periodic direction different from the fourth periodic direction.

Here, as illustrated in FIG. 5, the fourth periodic direction of the periodic structure of the fly-eye lens 17 includes a plurality of fourth periodic directions (1) and (2) different from each other. As illustrated in FIG. 12 and FIG. 13, the fifth periodic direction of the pseudo light source image by the fly-eye lens 17 includes a plurality of fifth periodic directions (1) and (2) different from each other.

In the present embodiment, the optical element 14 and the uniformizing optical member (fly-eye lens 17) are disposed to allow the first to third periodic directions and the fourth and fifth periodic directions to be different from one another. The driver 15 vibrates the optical element 14 to allow the vibration direction to be inclined to any of the first to third periodic directions and the fifth periodic direction.

For example, the fourth periodic direction (1) is set to 0°, and the fourth periodic direction (2) is set to 90°. The pseudo light source image formed by the light that has entered the fly-eye lens 17 includes periodicity in the fourth periodic directions (1) and (2), and also includes periodicity in the fifth periodic direction (1)=about 30° and in the fifth periodic direction (2)=about 150°. The optical element 14 is disposed to allow vibration direction=90° by the driver 15 to be inclined to any of the periodic directions excluding the fourth periodic direction (2).

As described above, the vibration direction of the optical element 14 is so arranged as to be inclined to any of the periodic structures and any of the periodicities formed by the pseudo light source image excluding the fourth periodic direction (2). In order to satisfy the relationship, as illustrated in FIG. 13, an angle θ1 of the first periodic direction with respect to the X-axis direction and an angle θ2 of the second periodic direction with respect to the X-axis direction are desirably within the following ranges.

30°<θ1<90°

90°<θ2<150°

Note that it is sufficient for each of the periodic directions to be inclined to the vibration direction, and the value of the angle of each of the periodic directions is not limited to the example described above. Any combination other than the combination of the periodic directions illustrated in FIG. 13 may be adopted.

[1.3 Effects]

As described above, according to the present embodiment, the vibration direction of the optical element 14 is inclined to the periodic directions of the periodic structure of the optical element 14, which makes it possible to reduce luminance unevenness of the illumination light.

According to the technique of the present disclosure, the speckle noise and the interference fringe that are caused by coherency specific to the laser light are improved. Moving the driving direction itself of the optical element 14 in a direction in which an aspect ratio is small makes it possible to minimize the size of the optical element 14. This makes it possible to achieve a small laser projector with high definition that is mountable on a small and light-weight electronic apparatus.

Note that the effects described in the present specification are illustrative and non-limiting, and other effects may be included. The same is true of effects by the following other embodiments.

2. Second Embodiment

Next, description is given of a display unit according to a second embodiment of the present disclosure. Note that, in the following, parts substantially same as the components of the display unit according to the foregoing first embodiment are denoted by the same reference numerals, and description thereof is omitted where appropriate.

[2.1 Overall Description of Display Unit]

[Overall Configuration of Display Unit]

FIG. 14 illustrates a configuration example of a display unit 3A according to the second embodiment of the present disclosure.

The display unit 3A is a projector that projects image (image light) on the screen 30 (projection surface), and includes the illumination device 1A and an optical system (display optical system) that performs image display with use of illumination light from the illumination device 1.

An illumination device 1A includes the red laser 11R, the green laser 11G, the blue laser 11B, the coupling lenses 12R, 12G, and 12B, dichroic prisms 131A and 132A, the optical element 14, the driver 15, fly-eye lenses 151 and 152, sub-condenser lenses 161 and 162, and a condenser lens 117.

The coupling lens 12G is a lens to collimate the green laser light emitted from the green laser 11G (into parallel light), to couple the collimated light to the dichroic prism 131A. Likewise, the coupling lens 12B is a lens (coupling lens) that collimates the blue laser light emitted from the blue laser 11B to couple the collimated light to the dichroic prism 131A. Further, the coupling lens 12R is a lens that collimates the red laser light emitted from the red laser 11R to couple the collimated light to the dichroic prism 132A. Note that, in this example, the incident laser light is collimated (into parallel light) by the coupling lenses 12R, 12G, and 12B; however, the configuration is not limited to the case. The laser light may not be collimated (into parallel light) by the coupling lenses 12R, 12G, and 12B. It is more desirable, however, that collimating be performed as described above because it is possible to downsize the unit configuration.

The dichroic prism 131A is a prism that allows the blue laser light incident through the coupling lens 12B to be selectively transmitted therethrough, whereas selectively reflects the green laser light incident through the coupling lens 12G. The dichroic prism 132A is a prism that allows the blue laser light and the green laser light outputted from the dichroic prism 131A to be selectively transmitted therethrough, whereas selectively reflects the red laser light incident through the coupling lens 12R. As a result, color synthesis (optical path synthesis) of the red laser light, the green laser light, and the blue laser light is performed.

Note that a dichroic mirror may be used in place of each of the dichroic prisms 131A and 132A.

The optical element 14 is disposed in an optical path of the light emitted from the light source section. The optical element 14 is disposed in an optical path between the two fly-eye lenses 151 and 152 (specifically, between paired sub-condenser lenses 161 and 162).

Each of the fly-eye lenses 151 and 152 is a uniformizing optical member that is disposed in the optical path of the light emitted from the light source section, and uniformizes light illuminance distribution in a predetermined illumination range illuminated by the light from the light source section. For example, each of the fly-eye lenses 151 and 152 is an integrator in which a plurality of unit lenses are two-dimensionally arranged on a substrate, and spatially divides an incident light flux in accordance with the arrangement of the plurality of unit lenses, and outputs the divided light fluxes. The fly-eye lens 151 is a fly-eye lens on preceding-stage side as viewed from the above-described light source section, and is disposed in an optical path between the dichroic prism 132A and the optical element 14. The fly-eye lens 152 is a fly-eye lens on subsequent-stage side and is disposed in an optical path between the optical element 14 and the condenser lens 117. The divided light fluxes are so outputted from each of the fly-eye lenses 151 and 152 as to be superimposed to one another. As a result, light L2out outputted from the fly-eye lens 152 is uniformized (light quantity distribution in plane is uniformized), and the uniformized light is outputted as illumination light. Each of the fly-eye lenses 151 and 152 may include a unit lens having a predetermined curvature not only on side of the light incident surface but also on side of the light output surface in order to efficiently use obliquely incident light as the illumination light.

The fly-eye lens 151 includes an incidence-side array A1in in which a plurality of unit lenses are arranged, on side of a light incident surface S1in on which incident light L1in is incident from side of the light source section. In addition, the fly-eye lens 151 includes an output-side array A1out in which a plurality of unit lenses are arranged, on side of a light output surface S1out from which output light is outputted.

The fly-eye lens 152 includes an incidence-side array A2in in which a plurality of unit lenses are arranged, on side of a light incident surface S2in on which incident light L2in is incident from side of the fly-eye lens 151. In addition, the fly-eye lens 152 includes an output-side array A2out in which a plurality of unit lenses are arranged, on side of a light output surface S2out from which output light is outputted.

The sub-condenser lenses 161 and 162 are each disposed in an optical path between the two fly-eye lenses 151 and 152. Specifically, the sub-condenser lens 161 is disposed on side close to the fly-eye lens 151, and the sub-condenser lens 162 is disposed on side close to the fly-eye lens 152. The sub-condenser lenses 161 and 162 are each a lens including a positive power and configure a relay optical system. Specifically, the sub-condenser lens 161 is a lens that condenses the light outputted from the fly-eye lens 151 and causes the condensed light to enter the optical element 14. Likewise, the sub-condenser lens 162 is a lens that condenses the light outputted from the optical element 14 and causes the condensed light to enter the fly-eye lens 152.

The condenser lens 117 is a lens that condenses light L2out outputted from the fly-eye lens 152, and outputs the condensed light as the illumination light.

(Display Optical System)

The above-described display optical system includes the polarization beam splitter 22, a field lens 24, the reflective liquid crystal element 21, and the projection lens 23.

The field lens 24 is disposed in an optical path between the polarization beam splitter 22 and the reflective liquid crystal element 21. The field lens 24 is a lens to make the optical system more compact by causing the illumination light to telecentrically enter the reflective liquid crystal element 21.

(Display Operation)

In the illumination device 1A of the display unit 3A, the light (laser light) emitted from the red laser 11R, the green laser 11G, and the blue laser 11B are first respectively collimated by the coupling lenses 12R, 12G, and 12B into parallel light. Next, the laser light (red laser light, green laser light, and blue laser light) thus collimated into the parallel light is subjected to color synthesis (optical path synthesis) by the dichroic prisms 131A and 132A. The laser light subjected to the optical path synthesis pass through the fly-eye lens 151, the sub-condenser lens 161, the optical element 14, the sub-condenser lens 162, the fly-eye lens 152, and the condenser lens 117 in this order, and the resultant light is outputted as the illumination light. At this time, the light L2out outputted from the fly-eye lens 152 is uniformized (light quantity distribution in plane is uniformized) by the fly-eye lenses 151 and 152. The illumination light is emitted from the illumination device 1A in such a manner.

Next, the illumination light is selectively reflected by the polarization beam splitter 22, and the reflected illumination light enters the reflective liquid crystal element 21 through the field lens 24. In the reflective liquid crystal element 21, the incident light is reflected while being modulated on the basis of the image signal, and the resultant light is outputted as the image light. At this time, the polarized light varies between in entering and in outputting in the reflective liquid crystal element 21, and thus the image light outputted from the reflective liquid crystal element 21 is selectively transmitted through the polarization beam splitter 22 and enters the projection lens 23. Thereafter, the incident light (image light) is projected (enlarged and projected) on the screen 30 by the projection lens 23.

At this time, the red laser 11R, the green laser 11G, and the blue laser 11B perform, for example, intermittent light emission operation at respective predetermined light emission frequencies. As a result, the laser light (red laser light, green laser light, and blue laser light) is sequentially emitted time-divisionally. In addition, in the reflective liquid crystal element 21, the laser light of a corresponding color is sequentially modulated time-divisionally on the basis of the image signal of each of color components (red component, green component, and blue component). The color image display based on the image signal is performed in the display unit 3A in the above-described manner.

[2.2 Detailed Description of Optical Element and Uniformizing Optical Member (Description of Periodic Directions)]

Relationship between the periodic directions and the vibration direction of the optical element 14 may be substantially similar to the relationship in the foregoing first embodiment. In the present embodiment, the periodic structure of the fly-eye lens 151 on the side of the light source section of the optical element 14 is different from that of the uniformizing optical member (fly-eye lens 17) according to the foregoing first embodiment. Note that the fly-eye lens 152 on light output side of the optical element 14 may be substantially similar to the uniformizing optical member according to the foregoing first embodiment.

FIG. 15 illustrates an example of the periodic structure of the fly-eye lens 151. FIG. 16 illustrates an example of a pseudo light source image by the fly-eye lens 151. FIG. 17 illustrates an example of first to fifth periodic directions relating to the optical element 14 and the fly-eye lens 151.

The fly-eye lens 151 includes the periodic structure in the fourth periodic direction. The fly-eye lens 151 forms a periodic pseudo light source image (second pseudo light source image) in the fourth periodic direction and in the fifth periodic direction different from the fourth periodic direction.

As illustrated in FIG. 15, the fly-eye lens 151 includes the periodic structure of hexagonal cells. Accordingly, as illustrated in FIG. 15, the fourth periodic direction of the periodic structure of the fly-eye lens 151 includes a plurality of fourth periodic directions (1), (2), and (3) different from one another. As illustrated in FIG. 16 and FIG. 17, the fifth periodic direction of the pseudo light source image by the fly-eye lens 151 includes a plurality of fifth periodic directions (1), (2), and (3) different from one another.

The driver 15 vibrates the optical element 14 to allow the vibration direction to be inclined to any of the first to third periodic directions, the fourth periodic direction, and the fifth periodic direction.

For example, the fly-eye lens 151 includes the periodic structure of the fourth periodic direction (1)=45°, the fourth periodic direction (2)=105°, and the fourth periodic direction (3)=165°. The pseudo light source image formed by the light that has entered the fly-eye lens 151 includes periodicity in the fourth periodic directions (1), (2), and (3), and also includes periodicity in the fifth periodic direction (1)=about 15°, in the fifth periodic direction (2)=about 75°, and in the fifth periodic direction (3)=about 135°. The optical element 14 is disposed to allow the vibration direction=90° by the driver 15 to be inclined to any of the periodic directions.

As described above, the vibration direction of the optical element 14 is so arranged as to be inclined to any of the periodic structures and any of the periodicities formed by the pseudo light source image. In order to satisfy the relationship, as illustrated in FIG. 17, the angle θ1 of the first periodic direction with respect to the X-axis direction and the angle θ2 of the second periodic direction with respect to the X-axis direction are desirably within the following ranges.

$$45° < θ1 < 75°$$

$$135° < θ2 < 165°$$

Taking into consideration the relationship of FIG. 13, the angle θ2 is more desirably within the following range.

$$135° < θ2 < 150°$$

Note that it is sufficient for each of the periodic directions to be inclined to the vibration direction, and the value of the angle of each of the periodic directions is not limited to the example described above. Any combination other than the combination of the periodic directions illustrated in FIG. 17 may be adopted.

[2.3 Effects]

As described above, according to the present embodiment, the vibration direction of the optical element 14 is inclined to any of the periodic directions of the periodic structure of the fly-eye lens 151 and the optical element 14 and the periodic directions of the pseudo light source image, which makes it possible to reduce luminance unevenness of the illumination light.

Other configurations, operation, and effects may be substantially similar to those in the display unit 3 according to the foregoing first embodiment.

3. Other Embodiments

The technique by the present disclosure is not limited to the description of the above-described embodiments, and various modifications may be made.

For example, the present technology may have the following configurations.

(1)

An illumination device including:

a light source section including a laser light source;

an optical element including a periodic structure, and disposed in an optical path of light emitted from the light source section; and a driver that vibrates the optical element to cause a vibration direction to be inclined to a periodic direction of the periodic structure of the optical element.

(2)

The illumination device according to (1), in which the optical element includes the periodic structure in a first periodic direction and a second periodic direction that are different from each other, and an angle formed by the first periodic direction and the vibration direction and an angle formed by the second periodic direction and the vibration direction are asymmetrical about the vibration direction.

(3)

The illumination device according to (2), in which the optical element includes a light incident surface and a light output surface, the optical element includes the periodic structure in the first periodic direction on the light incident surface, and the optical element includes the periodic structure in the second periodic direction on the light output surface.

(4)

The illumination device according to (2), in which the optical element includes a light incident surface and a light output surface, and the optical element includes the periodic structure in the first periodic direction and the second periodic direction on one of the light incident surface and the light output surface.

(5)

The illumination device according to any one of (2) to (4), in which the optical element forms a periodic first pseudo light source image in the first and second periodic directions and in a third periodic direction that is different from the first and second periodic directions, and the driver vibrates the optical element to cause the vibration direction to be inclined to any of the first to third periodic directions.

(6)

The illumination device according to (5), further including a uniformizing optical member that includes a periodic structure in a fourth periodic direction, is disposed in the optical path of the light emitted from the light source section, forms a periodic second pseudo light source image in the fourth periodic direction and in a fifth periodic direction different from the fourth periodic direction, and uniformizes light illuminance distribution, the optical element and the uniformizing optical member being disposed to cause the first to third periodic directions and the fourth and fifth periodic directions to be different from one another, and the driver vibrating the optical element to cause the vibration direction to be inclined to any of the first to third periodic directions and the fifth periodic direction.

(7)

The illumination device according to (6), in which the driver vibrates the optical element to cause the vibration direction to be inclined also to the fourth periodic direction.

(8)

The illumination device according to any one of (1) to (7), in which the optical element includes a first optical surface that outputs incident laser light while converging the incident laser light, and a second optical surface that outputs the incident laser light while diffusing the incident laser light.

(9)

The illumination device according to (8), in which the first optical surface and the second optical surface are coupled to each other to cause an optical path of the converged light outputted from the first optical surface and an optical path of the diffused light outputted from the second optical surface to be continuously changed.

(10)

The illumination device according to (8) or (9), in which the first optical surface is a convex curved surface, and the second optical surface is a concave curved surface.

(11)

The illumination device according to any one of (8) to (10), in which the optical element includes a light incident surface and a light output surface, and the optical element includes the first optical surface and the second optical surface on one or both of the light incident surface and the light output surface.

(12)

The illumination device according to any one of (8) to (11), in which a pitch of the first optical surface and a pitch of the second optical surface are different from each other.

(13)

A display unit including:

an illumination device; and a light modulation element that modulates illumination light from the illumination device on a basis of an image signal, the illumination device including a light source section including a laser light source, an optical element including a periodic structure, and disposed in an optical path of light emitted from the light source section, and a driver that vibrates the optical element to cause a vibration direction to be inclined to a periodic direction of the periodic structure of the optical element.

(14)

The display unit according to (13), further including a projection optical system that projects, on a projection surface, the illumination light modulated by the light modulation element.

This application claims the benefit of Japanese Priority Patent Application JP2016-144099 filed with the Japan Patent Office on Jul. 22, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An illumination device, comprising:
a light source section that includes a laser light source;
an optical element that includes a first periodic structure in a first periodic direction and a second periodic direction different from the first periodic direction, wherein
the optical element is in an optical path of light emitted from the light source section,
the optical element is configured to form a periodic first pseudo light source image in the first periodic direction, in the second periodic direction, and in at least one third periodic direction of a plurality of third periodic directions,
the at least one third periodic direction is different from each of the first periodic direction and the second periodic direction, and
the plurality of third periodic directions are different from one another; and
a driver configured to vibrate the optical element to cause a vibration direction to be inclined to at least one of the first periodic direction, the second periodic direction, or the at least one third periodic direction.

2. The illumination device according to claim 1, wherein
the optical element includes a light incident surface and a light output surface,
the optical element includes the first periodic structure in the first periodic direction on the light incident surface, and
the optical element includes the first periodic structure in the second periodic direction on the light output surface.

3. The illumination device according to claim 1, wherein
the optical element includes a light incident surface and a light output surface, and
the optical element includes the first periodic structure in the first periodic direction and the second periodic direction on one of the light incident surface or the light output surface.

4. The illumination device according to claim 1, further comprising
a uniformizing optical member that includes a second periodic structure in a fourth periodic direction, wherein the uniformizing optical member is in the optical path of the light emitted from the light source section, the uniformizing optical member is configured to:

form a periodic second pseudo light source image in the fourth periodic direction and in a fifth periodic direction different from the fourth periodic direction; and uniformize light illuminance distribution.

5. The illumination device according to claim 4, wherein the driver is further configured to vibrate the optical element to cause the vibration direction to be inclined to the fourth periodic direction.

6. The illumination device according to claim 1, wherein the optical element further includes:

a first optical surface configured to converge incident laser light and output converged light; and a second optical surface configured to diffuse the incident laser light and output diffused light.

7. The illumination device according to claim 6, wherein the first optical surface is coupled to the second optical surface to cause an optical path of the converged light outputted from the first optical surface and an optical path of the diffused light outputted from the second optical surface to be continuously changed.

8. The illumination device according to claim 6, wherein the first optical surface comprises a convex curved surface, and the second optical surface comprises a concave curved surface.

9. The illumination device according to claim 6, wherein the optical element includes a light incident surface and a light output surface, and the optical element includes the first optical surface and the second optical surface on at least one of the light incident surface or the light output surface.

10. The illumination device according to claim 6, wherein a pitch of the first optical surface is different from a pitch of the second optical surface.

11. A display unit, comprising:

an illumination device; and a light modulation element configured to modulate illumination light from the illumination device based on an image signal, wherein the illumination device comprises:

a light source section including a laser light source;

an optical element that includes a periodic structure in a first periodic direction and a second periodic direction different from the first periodic direction, wherein the optical element is in an optical path of light emitted from the light source section, the optical element is configured to form a periodic first pseudo light source image in the first periodic direction, in the second periodic direction, and in at least one third periodic direction of a plurality of third periodic directions, the at least one third periodic direction is different from each of the first periodic direction and the second periodic direction, and the plurality of third periodic directions are different from one another; and a driver configured to vibrate the optical element to cause a vibration direction to be inclined to at least one of the first periodic direction, the second periodic direction, or the at least one third periodic direction.

12. The display unit according to claim 11, further comprising a projection optical system configured to project, on a projection surface, the illumination light modulated by the light modulation element.

13. An illumination device, comprising:

a light source section that includes a laser light source;

an optical element that includes a first periodic structure in a first periodic direction and a second periodic direction different from the first periodic direction, wherein the optical element is in an optical path of light emitted from the light source section;

a driver configured to vibrate the optical element to cause a vibration direction to be inclined to the first periodic direction and the second periodic direction of the first periodic structure of the optical element, wherein an angle between the first periodic direction and the vibration direction is different from an angle between the second periodic direction and the vibration direction, wherein the optical element is configured to form a periodic first pseudo light source image in the first periodic direction and the second periodic direction, and in a third periodic direction that is different from the first periodic direction and the second periodic direction, and the driver is further configured to vibrate the optical element to cause the vibration direction to be inclined to at least one of the first periodic direction, the second periodic direction, or the third periodic direction; and a uniformizing optical member that includes a second periodic structure in a fourth periodic direction, wherein the uniformizing optical member is in the optical path of the light emitted from the light source section, the uniformizing optical member is configured to:

form a periodic second pseudo light source image in the fourth periodic direction and in a fifth periodic direction different from the fourth periodic direction; and uniformize light illuminance distribution, the optical element and the uniformizing optical member are configured to cause the first periodic direction, the second periodic direction, and the third periodic direction to be different from the fourth periodic direction and the fifth periodic direction, and the driver is further configured to cause the vibration direction to be inclined to at least one of the first periodic direction, the second periodic direction, the third periodic direction, or the fifth periodic direction.

* * * * *